(12) United States Patent
Horisaki

(10) Patent No.: US 8,422,983 B2
(45) Date of Patent: Apr. 16, 2013

(54) METHOD OF CONTROLLING POWER CONSUMPTION FOR A RADIO RECEIVER

(75) Inventor: Koji Horisaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 12/721,737

(22) Filed: Mar. 11, 2010

(65) Prior Publication Data

US 2010/0239049 A1     Sep. 23, 2010

(30) Foreign Application Priority Data

Mar. 19, 2009   (JP) ................................ 2009-068890

(51) Int. Cl.
*H04B 1/16* (2006.01)
(52) U.S. Cl.
USPC ....................................... 455/343.2; 455/574
(58) Field of Classification Search ............... 455/550.1, 455/574, 575.1, 127.1, 343.1, 343.2, 343.3, 455/343.4
See application file for complete search history.

(56) References Cited

U.S. PATENT DOCUMENTS

| 6,134,430 | A | 10/2000 | Younis et al. |
| 6,931,267 | B2 * | 8/2005 | Darabi ........................ 455/574 |
| 7,016,654 | B1 * | 3/2006 | Bugeja ....................... 455/343.1 |
| 2008/0238741 | A1 | 10/2008 | Horisaki |
| 2009/0245125 | A1 | 10/2009 | Horisaki et al. |
| 2010/0034182 | A1 | 2/2010 | Sekiya et al. |

FOREIGN PATENT DOCUMENTS

| JP | 10-163995 | 6/1998 |
| JP | 2001526486 | 12/2001 |
| JP | 2002-368673 | 12/2002 |
| JP | 2003-318854 | 11/2003 |
| JP | 2005-109963 | 4/2005 |
| JP | 2007074230 | 3/2007 |
| JP | 2008-072742 | 3/2008 |
| JP | 2008072742 | 3/2008 |
| JP | 2008098910 | 4/2008 |

OTHER PUBLICATIONS

Matsui, et al.; A 14bit Digitally Self-Calibrated Pipelined ADC with Adaptive Bias Optimization for Arbitrary Speeds up to 40MS/s, Symposium on VLSI Circuits Digest of Technical Papers, 2005, pp. 330-333.
Sakai, et al.; A Digital TV Receiver RF and BB Chipset with Adaptive Bias-Current Control for Mobile Applications, IEEE International Solid-State Circuits Conference, Digest of Technical Papers, 2007, Session 11, TV Tuner, RFID, 11.4, pp. 212-213 & 597.
Japanese Office Action for Japanese Application No. 2009-068890 mailed on Aug. 2, 2011.

* cited by examiner

*Primary Examiner* — Thanh Le
(74) *Attorney, Agent, or Firm* — Turocy & Watson, LLP

(57) ABSTRACT

In a radio receiver, an analog/digital converting unit, which digitalizes a received signal down-converted in a radio frequency unit and takes the digitalized signal in a baseband unit, is capable of setting a bias current. A method of controlling power consumption includes determining whether a change is a first change in which a state is changed from a receive state to a standby state of the communication signal or a second change in which a state is changed from the standby state to the receive state based on a digital signal output from the analog/digital converting unit; and setting the bias current to a value smaller than a value in case of the second change when the determined change is the first change, and setting the bias current to a value larger than a value in case of the first change when the determined change is the second change.

8 Claims, 5 Drawing Sheets

METHOD OF CONTROLLING POWER CONSUMPTION FOR A RADIO RECEIVER

CROSS-REFERENCE TO RELATED APPLICATIONS

This application is based upon and claims the benefit of priority from the prior Japanese Patent Application No. 2009-068890, filed on Mar. 19, 2009; the entire contents of which are incorporated herein by reference.

BACKGROUND OF THE INVENTION

1. Field of the Invention

The present invention relates to a method of controlling power consumption for a radio receiver.

2. Description of the Related Art

For a radio that is limited in power usage such as a radio attached to a cellular phone or a laptop computer, various countermeasures are taken to reduce the power consumption. In a baseband unit of a radio receiver, the power consumption in a logic circuit is reduced due to the benefits of miniaturization and voltage reduction; however, an analog/digital converting unit (ADC) that is an analog circuit used to interface with a radio frequency unit cannot get the above benefits and therefore remains as a target for power reduction.

The power reduction of the ADC can be achieved by controlling a bias current. Therefore, in the present invention, it is considered to control the bias current of the ADC as a countermeasure for further reducing the power consumption of the radio receiver.

In this case, in a packet communication system, a modulation scheme is different for each packet in some cases. Moreover, even in a communication system in which a plurality of data is transmitted in one frame, the modulation scheme is different for each data in some cases. In this case, performance required for the ADC in the radio receiver is different depending on the modulation scheme. For example, a signal to noise ratio (SNR) required for the ADC is different between when receiving a signal modulated using 64 Quadrature Amplitude Modulation (QAM) and when receiving a signal modulated using Binary Phase Shift Keying (BPSK).

However, the performance of the ADC such as the SNR and a dynamic range changes along with the control of the bias current in the ADC, so that a problem arises in that the reception performance is degraded when applying to the radio receiver.

A technology for controlling the bias voltage of the ADC is disclosed, for example, in Japanese Patent Application Laid-open No. 2008-72742.

SUMMARY OF THE INVENTION

According to one aspect of the present invention, a method of controlling power consumption for a radio receiver that is configured such that an analog/digital converting unit, which digitalizes a received signal down-converted in a radio frequency unit and takes the digitalized signal in a baseband unit, is capable of setting a bias current, the method includes determining whether a change is a first change in which a state is changed from a receive state of a communication signal to a standby state of the communication signal or a second change in which a state is changed from the standby state to the receive state based on a digital signal output from the analog/digital converting unit; and setting the bias current to a value smaller than a value in a case of the second change when the determined change is the first change, and setting the bias current to a value larger than a value in a case of the first change when the determined change is the second change, in accordance with a result of judgment.

DETAILED DESCRIPTION OF THE INVENTION

A method of controlling power consumption for a radio receiver according to embodiments of the present invention are explained in detail below with reference to the accompanying drawings. The present invention is not limited to these embodiments.

Figure 1:
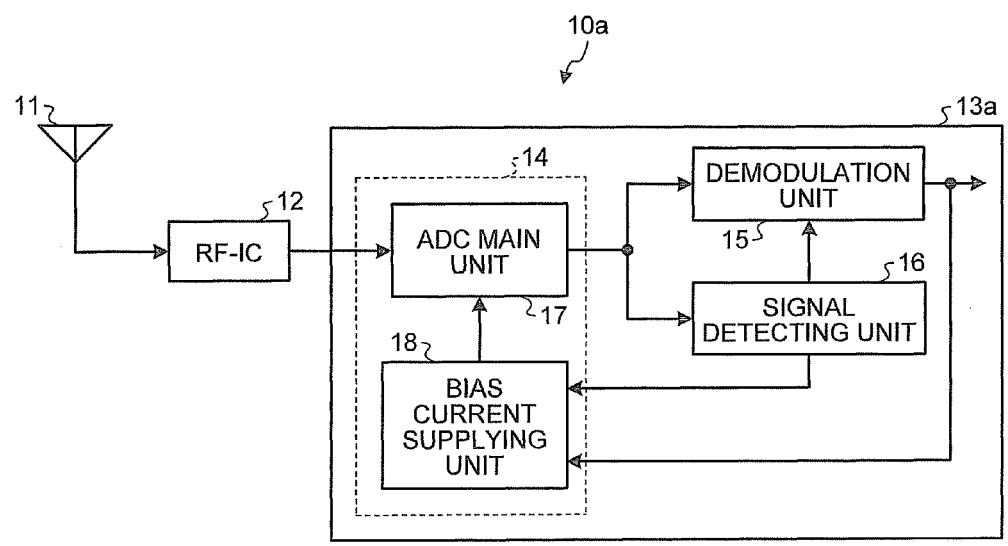
FIG. 1 is a block diagram illustrating a configuration example of a relevant portion of a radio receiver that performs a method of controlling power consumption for the radio receiver according to a first embodiment of the present invention.

FIG. 1 is a block diagram illustrating a configuration example of a relevant portion of a radio receiver that performs a method of controlling power consumption for the radio receiver according to a first embodiment of the present invention. In the first embodiment, explanation is given for a method of controlling power consumption that is preferable when intermittently transmitting and receiving a packet.

As shown in FIG. 1, a radio receiver 10a includes a radio frequency unit 12 to which a receiving antenna 11 is connected and a baseband unit 13a. The baseband unit 13a includes an ADC unit 14, a demodulation unit 15, and a signal detecting unit 16 as elements related to the first embodiment.

The radio frequency unit 12 includes a radio frequency integrated circuit (RF-IC), amplitudes a radio signal received by the receiving antenna 11, and outputs the radio signal to the ADC unit 14 after down-converting it into a frequency capable of being processed by the baseband unit 13*a*.

The ADC unit 14 includes an ADC main unit 17 and a bias current supplying unit 18. The ADC main unit 17 is a core circuit such as a pipeline-type ADC that actually performs a converting operation, and digitalizes a baseband signal from the radio frequency unit 12 and outputs it to the demodulation unit 15 and the signal detecting unit 16. The bias current supplying unit 18 is a circuit that controls a bias current of the ADC main unit 17 and has a basic configuration is as disclosed in Japanese Patent Application Laid-open No. 2008-72742. In the first embodiment, the bias current supplying unit 18 controls the bias current to be supplied to the ADC main unit 17 based on a demodulation signal in the demodulation unit 15 and a detection signal in the signal detecting unit 16.

The signal detecting unit 16 monitors a period in a receive state and a period in a standby state based on a state of a digital signal output from the ADC main unit 17. When the signal detecting unit 16 detects a timing at which the state has changed from the receive state to the standby state and a timing at which the state has changed from the standby state to the receive state, the signal detecting unit 16 outputs the detection signal to the demodulation unit 15 and the bias current supplying unit 18.

Specifically, the signal detecting unit 16 sequentially calculates an average of values indicated in the digital signal output from the ADC main unit 17 in a predetermined time, and monitors the change in a magnitude relation between the calculated average and a threshold value. When the calculated average is maintained in a state equal to or smaller than the threshold value, the signal detecting unit 16 determines that the state is the standby state. On the contrary, when the calculated average is maintained in a state equal to or larger than the threshold value, the signal detecting unit 16 determines that the state is the receive state. Then, when the calculated average is changed from the value equal to or larger than the threshold value to the value equal to or smaller than the threshold value, the signal detecting unit 16 determines that the state has changed to the standby state. In a reverse case, the signal detecting unit 16 determines that the state has changed to the receive state.

When a change detection signal to the receive state is input from the signal detecting unit 16, the demodulation unit 15 starts a demodulation operation and continues demodulation processing during the period until the change detection signal to the standby state is input.

The bias current supplying unit 18, for example, selects a small value applied at the time of the standby or a value that is applied at the time of the receive state and is larger than at the time of the standby as the bias current value, in accordance with the detection signal from the signal detecting unit 16. Two or more bias current values to be applied at the time of the receive state can be prepared and one of them may be selected considering the reception level.

In other words, when the change detection signal to the receive state is input from the signal detecting unit 16, the bias current supplying unit 18 stands by for input of the demodulation signal from the demodulation unit 15. When the demodulation signal is input from the demodulation unit 15, the bias current supplying unit 18 selects the large bias current and starts supplying it to the ADC main unit 17 until the input of the demodulation signal from the demodulation unit 15 ends. Then, when the change detection signal to the standby state is input from the signal detecting unit 16, the bias current supplying unit 18 selects the small bias current and supplies it to the ADC main unit 17 during the period until the change detection signal to the receive state is input from the signal detecting unit 16.

Figure 2:
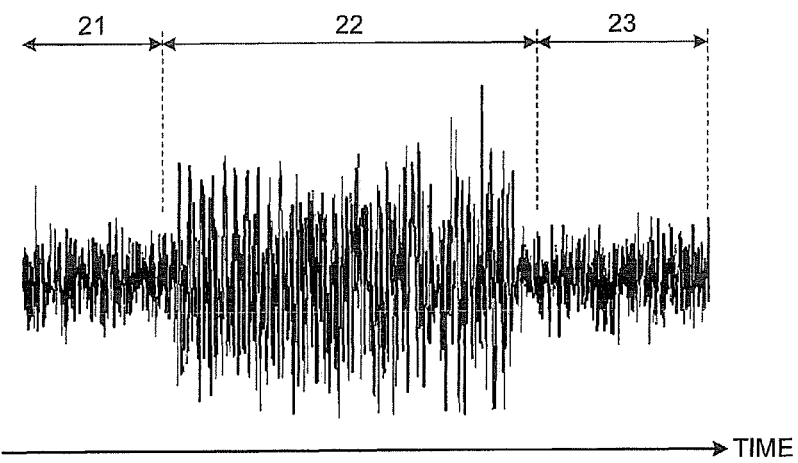
FIG. 2 is a schematic diagram of a received waveform explaining the method of controlling power consumption performed in the radio receiver shown in FIG. 1.

Next, FIG. 2 is a schematic diagram of a received waveform explaining the method of controlling power consumption performed in the radio receiver shown in FIG. 1. In FIG. 2, intervals 21 and 23 are a period in which the average of the values indicated in the digital signal output from the ADC main unit 17 is equal to or smaller than the threshold value, i.e., a period at the time of the standby in which a significant signal is not present. An interval 22 is a period in which the average of the values indicated in the digital signal output from the ADC main unit 17 is equal to or larger than the threshold value, i.e., a period in the receive state in which a significant signal is present.

When the signal detecting unit 16 detects the change from the interval 21 to the interval 22, the bias current supplying unit 18 sets the bias current to the large value. The demodulation unit 15 starts the demodulation operation and continues this operation until the end of the interval 22. Thereafter, when the signal detecting unit 16 detects the change from the interval 22 to the interval 23, the bias current supplying unit 18 sets the bias current to the small value. The demodulation unit 15 ends the demodulation operation to be in a stopped state.

Typically, the performance (e.g., the SNR and the dynamic range) of the ADC required at the time of the standby is relatively low, so that the influence on the reception performance is considered to be small even when the bias current is set to the small value as described above.

In this manner, according to the first embodiment, the bias current of the ADC is controlled to be large in the receive state and small at the time of the standby state, so that the power consumption at the time of the standby can be reduced without degrading the reception performance.

Figure 3:
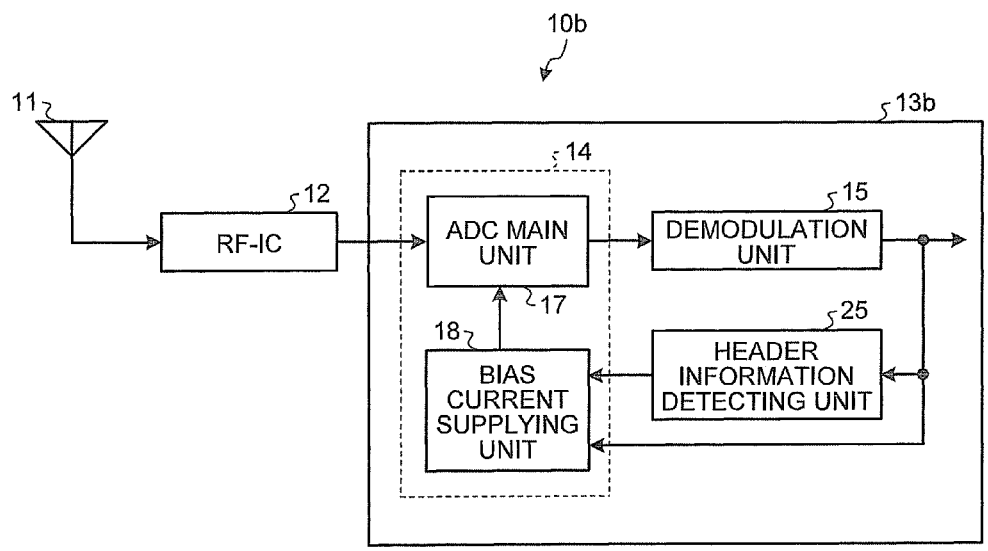
FIG. 3 is a block diagram illustrating a configuration example of a relevant portion of a radio receiver that performs a method of controlling power consumption for the radio receiver according to a second embodiment of the present invention.
Figure 4:
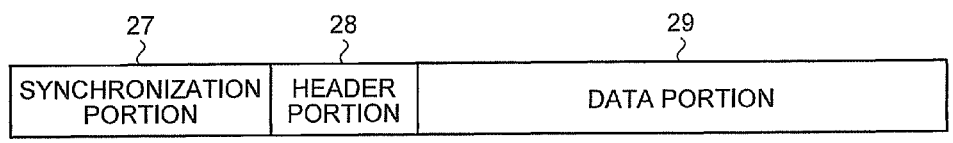
FIG. 4 is a diagram illustrating an example of a transmission format to which the method of controlling power consumption performed in the radio receiver shown in FIG. 3 is applied.

FIG. 3 is a block diagram illustrating a configuration example of a relevant portion of a radio receiver that performs a method of controlling power consumption for the radio receiver according to a second embodiment of the present invention. FIG. 4 is a diagram illustrating an example of a transmission format to which the method of controlling power consumption performed in the radio receiver shown in FIG. 3 is applied.

In FIG. 3, components that are the same as or similar to those shown in FIG. 1 (first embodiment) are given the same reference numerals. Portions related to the second embodiment are mainly explained.

As shown in FIG. 3, in a baseband unit 13*b* of a radio receiver 10*b* according to the second embodiment, the signal detecting unit 16 is eliminated and a header information detecting unit 25 is provided compared with the configuration shown in FIG. 1 (first embodiment). The demodulation signal of the demodulation unit 15 is input to the header information detecting unit 25.

As shown in FIG. 4, a signal received by the receiving antenna 11 has a configuration in which a synchronization portion 27 as a synchronization establishment section, a header portion 28 as an insertion section of various header information including a modulation scheme, and a data portion 29 as an insertion section of data are arranged in this order. The insertion position of the various header information in the header portion 28 and the arrangement position of each data in the data portion 29 are defined by the elapsed time from the synchronization establishment time in the synchronization portion 27.

In the second embodiment, the header information detecting unit 25 monitors the elapsed time from the synchronization establishment time in the synchronization portion 27, detects modulation scheme information that is one piece of the header information in the header portion 28 from the demodulation signal of the demodulation unit 15, and notifies the bias current supplying unit 18 of the detected modulation scheme.

As described above, the performance (e.g., the SNR and the dynamic range) of the ADC required for the ADC main unit 17 is different depending on the modulation scheme. Therefore, in the second embodiment, the bias current supplying unit 18 has a correspondence table that defines the bias current value with which a required performance can be realized for each modulation scheme although the basic configuration for controlling the bias current is similar to that shown in FIG. 1. When the modulation scheme is notified from the header information detecting unit 25, the bias current supplying unit 18 refers to this relation table, and selects and sets the bias current value with which the required performance can be realized. This correspondence table is defined such that the bias current value becomes large as the required performance becomes high.

Explanation is specifically given taking 64QAM and BPSK as examples of the communication system. A required SNR for demodulating data modulated by 64QAM with no error is larger than the case of BPSK, and a required performance of the ADC is also high in the case of demodulating data modulated by 64QAM. Therefore, when data in the data portion 29 of the receive signal is modulated by any one of 64QAM and BPSK, the large bias current value with which high SNR can be realized is defined for 64QAM and the bias current value with which the SNR lower than the case of 64QAM can be realized, i.e., the bias current value smaller than the case of 64QAM, is defined for BPSK, in the above described relation table included in the bias current supplying unit 18.

The bias current supplying unit 18 refers to this relation table. When the modulation scheme notified from the header information detecting unit 25 is 64QAM, the bias current supplying unit 18 sets the bias current value to be supplied to the ADC main unit 17 to the large value. When the modulation scheme notified from the header information detecting unit 25 is BPSK, the bias current supplying unit 18 sets the bias current value to be supplied to the ADC main unit 17 to the small value. Whereby, the power consumption at the time of BPSK reception can be reduced without degrading the demodulation performance at the time of 64QAM reception.

In this manner, according to the second embodiment, the bias current of the ADC can be controlled to increase and decrease in accordance with the modulation scheme, so that the power consumption at the time of reception by the modulation scheme of which required performance is not high can be reduced without degrading the demodulation performance by the modulation scheme of which required performance is high.

Figure 5:
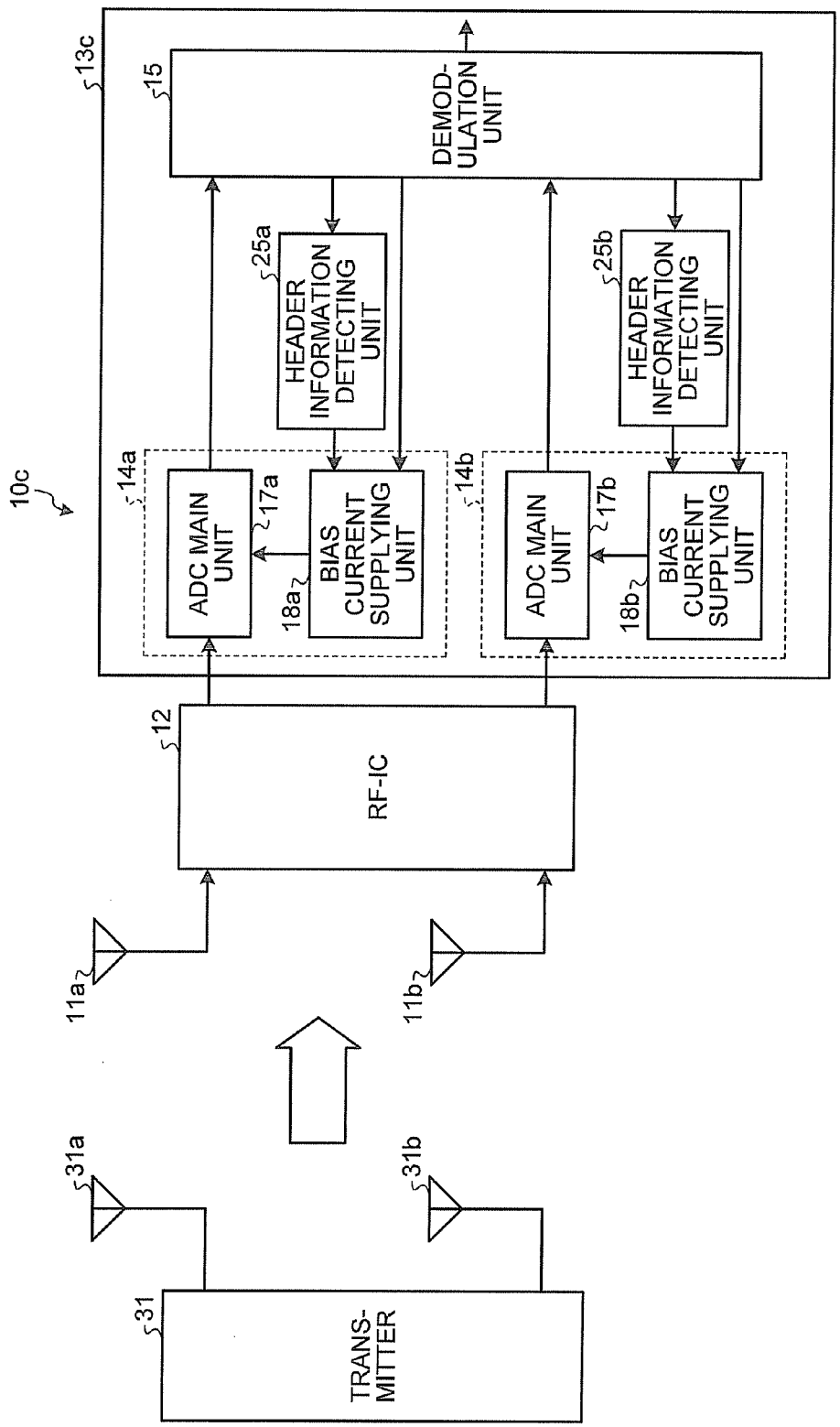
FIG. 5 is a block diagram illustrating a configuration example of a relevant portion of a radio receiver that performs a method of controlling power consumption for the radio receiver according to a third embodiment of the present invention.

FIG. 5 is a block diagram illustrating a configuration example of a relevant portion of a radio receiver that performs a method of controlling power consumption for the radio receiver according to a third embodiment of the present invention. In the third embodiment, explanation is given for the method of controlling power consumption for the radio receiver in a multi input multi output (MIMO) communication system in which a plurality of antennas is used on both of the transmitting and receiving sides. FIG. 5 illustrates a case in which both of the transmitting and receiving sides have two antennas for simplifying the explanation. The transmission format is similar to that shown in FIG. 4 and therefore the transmission format shown in FIG. 4 is appropriately incorporated.

In FIG. 5, a transmitter 31 includes two transmitting antennas 31a and 31b and transmits a signal by using both or any one of the transmitting antennas 31a and 31b. When the transmitter 31 transmits a signal by using the two transmitting antennas 31a and 31b, different signals are transmitted at the same time with the same frequency. The transmitter 31 inserts the number of data to be transmitted in parallel at the same time with the same frequency into the header portion 28 as the header information and notifies the receiving side thereof. The number of the parallel transmission data includes one obtained by copying one piece of data and one to which redundancy is added and which is transmitted from two or more antennas.

A radio receiver 10c according to the third embodiment includes the radio frequency unit (RE-IC) 12 connected to two receiving antennas 11a and 11b and a baseband unit 13c. The baseband unit 13c includes two ADC units 14a and 14b provided on two reception paths, the demodulation unit 15 common to the ADC units 14a and 14b, and two header information detecting units 25a and 25b provided between the ADC units 14a and 14b and the demodulation unit 15. The ADC units 14a and 14b include ADC main units 17a and 17b and bias current supplying units 18a and 18b, respectively.

First, content of the MIMO system is briefly explained. The radio frequency unit 12 is given the same reference numeral as that shown in FIGS. 1 and 3; however, in the present embodiment, the radio frequency unit 12 individually amplitudes the radio signals received by the receiving antennas 11a and 11b, down-converts them into a frequency in which the radio signals can be individually processed in the baseband unit 13c, outputs the receive signal received by the receiving antenna 11a to the ADC main unit 17a in the ADC unit 14a, and outputs the receive signal received by the receiving antenna 11b to the ADC main unit 17b in the ADC unit 14b. The ADC main units 17a and 17b are given the different reference numerals; however, they have the same configuration as that shown in FIGS. 1 and 3.

The demodulation unit 15 in the baseband unit 13c is given the same reference numeral as that shown in FIGS. 1 and 3; however, in the third embodiment, the demodulation unit 15 performs demodulation and synchronization processing on the received digital signals output from the ADC main units 17a and 17b to restore an original transmit signal. The above is an outline of the MIMO system.

Typically, in the MIMO system, as the number of the parallel transmission data becomes large, the dynamic range of the receive signal becomes large and furthermore the SNR for demodulation with no error becomes large, so that the performance required for the ADC also becomes high.

Therefore, in the third embodiment, in the same concept as shown in FIG. 3, the header information detecting units 25a and 25b are provided. The demodulation signal of the demodulation unit 15 is input to the bias current supplying units 18a and 18b in the ADC units 14a and 14b and the header information detecting units 25a and 25b.

The header information detecting units 25a and 25b each monitor the elapsed time from the synchronization establishment time in the synchronization portion 27, detect number of parallel transmission data information that is one of the header information in the header portion 28 from the demodulation signal of the demodulation unit 15, and notify the bias current supplying units 18a and 18b of the detected number of the parallel transmission data.

The bias current supplying units 18a and 18b each have a basic configuration for controlling the bias current similar to that shown in FIGS. 1 and 3; however, in the third embodiment, the bias current supplying units 18a and 18b each have a correspondence table that defines the bias current value with which a required performance can be realized for each number of the parallel transmission data. When the number of the parallel transmission data is notified from the header information detecting units 25a and 25b, the bias current supplying units 18a and 18b each refer to this correspondence table, and select and set the bias current value with which the required performance can be realized. This correspondence table is defined so that the bias current value becomes large as the number of the parallel transmission data increases.

In this example, the number of the antennas used for transmission is two. Therefore, in this relation table, when the number of the parallel transmission data is one, the small bias current value is set, and when the number of the parallel transmission data is two, the bias current value larger than the small bias current value is set. In this manner, when the notified number of the parallel transmission data is one, the bias current supplying units 18a and 18b set the bias current values to be supplied to the ADC main units 17a and 17b small, respectively. When the notified number of the parallel transmission data is two, the bias current supplying units 18a and 18b set the bias current values to be supplied to the ADC main units 17a and 17b large, respectively. Whereby, the power consumption when the number of the parallel transmission data is one can be reduced without degrading the demodulation result when the number of the parallel transmission data is two.

As is apparent from the above explanation, the number of the parallel transmission data detected by each of the header information detecting units 25a and 25b is the same and the control content of each of the bias current supplying units 18a and 18b is also the same, so that these units do not need to be provided for each of the ADC units 14a and 14b and can be shared.

In this manner, according to the third embodiment, in the radio receiver that is used in the MIMO communication system that performs communication by combining a plurality of antennas, the bias current of the ADC can be controlled to increase and decrease in accordance with the number of the parallel transmission data, so that the power consumption when the number of the parallel transmission data is small can be reduced without degrading the demodulation result when the number of the parallel transmission data is large.

The output of the ADC transiently becomes unstable in some cases immediately after switching the bias current, which is considered to influence the demodulation performance. Therefore, in the following two embodiments, explanation is given for the method for eliminating the influence of the unstable output in the transient state of the ADC on the demodulation performance.

Figure 6:
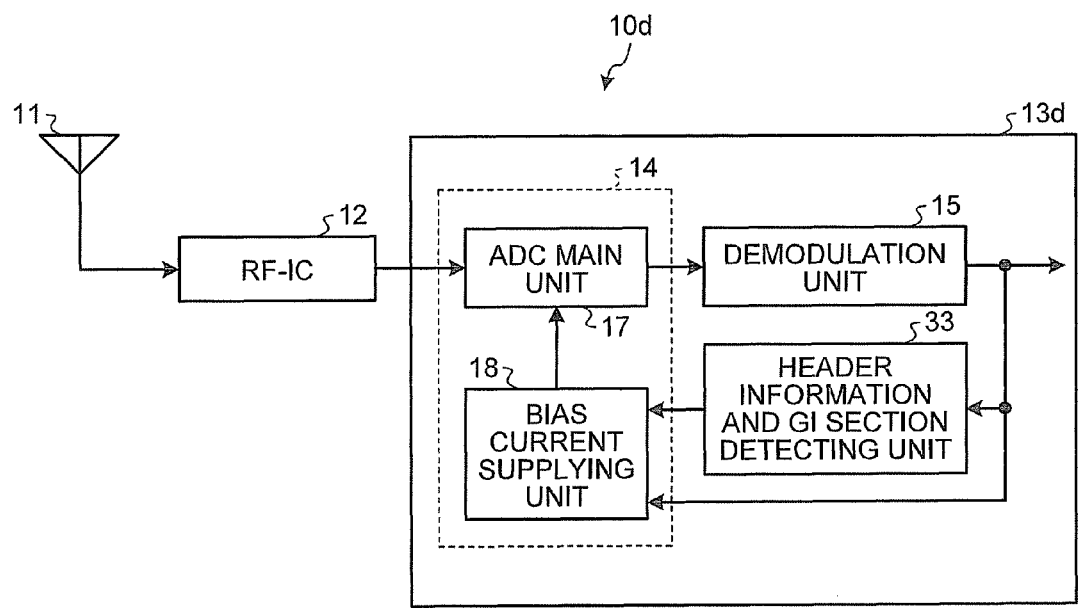
FIG. 6 is a block diagram illustrating a configuration example of a relevant portion of a radio receiver that performs a method of controlling power consumption for the radio receiver according to a fourth embodiment of the present invention.
Figure 7:
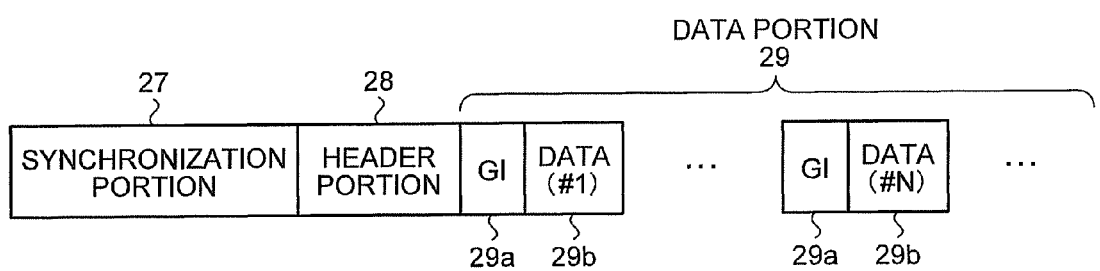
FIG. 7 is a diagram illustrating an example of a transmission format to which the method of controlling power consumption performed in the radio receiver shown in FIG. 6 is applied.

FIG. 6 is a block diagram illustrating a configuration example of a relevant portion of a radio receiver that performs a method of controlling power consumption for the radio receiver according to a fourth embodiment of the present invention. FIG. 7 is a diagram illustrating an example of a transmission format to which the method of controlling power consumption performed in the radio receiver shown in FIG. 6 is applied.

In FIG. 6, components that are the same as or similar to those shown in FIG. 3 (second embodiment) are given the same reference numerals. Portions related to the fourth embodiment are mainly explained.

As shown in FIG. 6, in a baseband unit 13d of a radio receiver 10d according to the fourth embodiment, a header information and guard interval (GI) section detecting unit 33 is provided instead of the header information detecting unit 25 compared with the configuration shown in FIG. 3 (second embodiment).

As shown in FIG. 7, a signal received by the receiving antenna 11 is in an orthogonal frequency division multiplexing (OFDM) modulation scheme, and the data portion 29 is configured such that a configuration in which a guard interval GI section 29a is arranged in front of a data DATA section 29b is repeated. The data portion 29 can be configured such that a configuration in which the guard interval GI section 29a is arranged behind the data DATA section 29b is repeated. The guard interval GI is added for easing the influence of the multipath reflected waves in the radio propagation paths and does not contribute the demodulation processing in the radio receiver 10d. Therefore, it is considered that the influence on the demodulation result in the data DATA section 29b is relatively low even if the ADC output becomes unstable by switching the bias current value in the guard interval GI section 29a.

Thus, in the fourth embodiment, the header information and GI section detecting unit 33 that detects the guard interval GI section 29a in addition to the header information (modulation scheme) is provided. The detection of the guard interval GI section 29a is performed by monitoring the elapsed time from the synchronization establishment time in the synchronization portion 27 in the similar manner to the detection of the header information (modulation scheme).

When the modulation scheme is notified from the header information and GI section detecting unit 33, the bias current supplying unit 18 determines the bias current value in accordance with the modulation scheme by the method explained in the second embodiment (FIG. 3). At this time, the bias current supplying unit 18 does not switch the bias current to be supplied to the ADC main unit 17. The bias current supplying unit 18 supplies the bias current determined as above to the ADC main unit 17 in the guard interval GI section 29a when the detection notification of the guard interval GI section 29a is input from the header information and GI section detecting unit 33. Whereby, the influence on the demodulation processing performed in the data DATA section 29b by the demodulation unit 15 can be reduced.

In this manner, according to the fourth embodiment, in addition to the effect similar to that in the second embodiment, the effect of reducing the influence of the ADC output in the transient state immediately after switching the bias current on the demodulation performance can be obtained.

Figure 8:
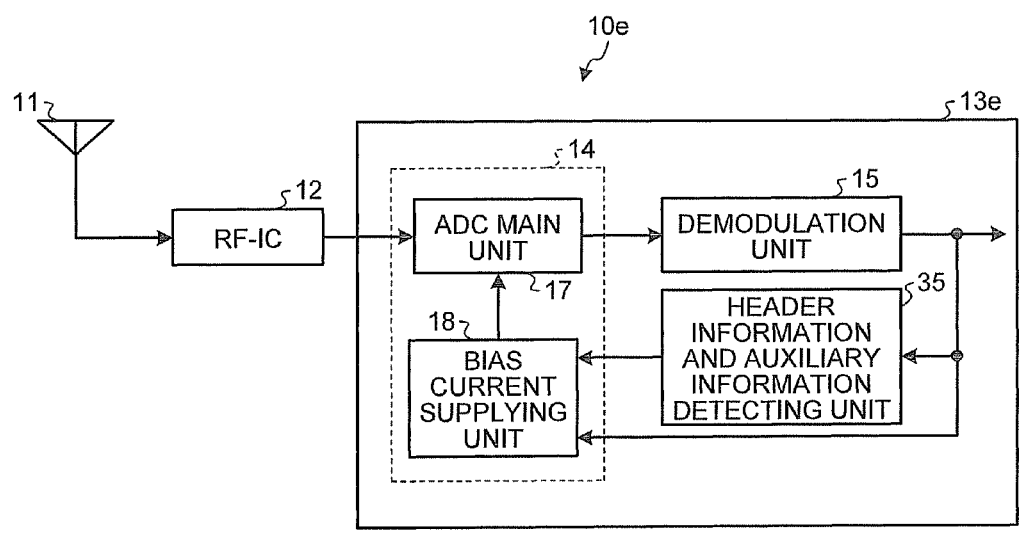
FIG. 8 is a block diagram illustrating a configuration example of a relevant portion of a radio receiver that performs a method of controlling power consumption for the radio receiver according to a fifth embodiment of the present invention.
Figure 9:
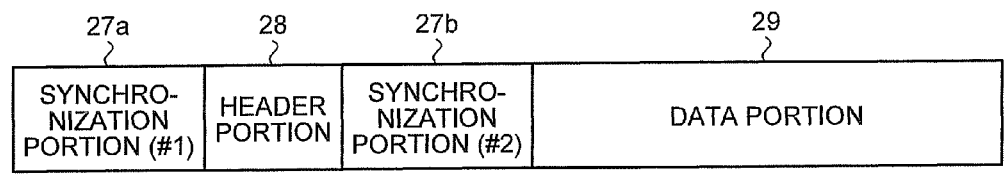
FIG. 9 is a diagram illustrating an example of a transmission format to which the method of controlling power consumption performed in the radio receiver shown in FIG. 8 is applied.

FIG. 8 is a block diagram illustrating a configuration example of a relevant portion of a radio receiver that performs a method of controlling power consumption for the radio receiver according to a fifth embodiment of the present invention. FIG. 9 is a diagram illustrating an example of a transmission format to which the method of controlling power consumption performed in the radio receiver shown in FIG. 8 is applied.

In FIG. 8, components that are the same as or similar to those shown in FIG. 3 (second embodiment) are given the same reference numerals. Portions related to the fifth embodiment are mainly explained.

As shown in FIG. 8, in a baseband unit 13e of a radio receiver 10e according to the fifth embodiment, a header information and auxiliary information detecting unit 35 is provided instead of the header information detecting unit 25 compared with the configuration shown in FIG. 3 (second embodiment).

As shown in FIG. 9, a signal received by the receiving antenna 11 has a configuration in which a synchronization portion (#1) 27a as a synchronization establishment section, the header portion 28 as an insertion section of various header information including the modulation scheme, a synchronization portion (#2) 27b as an insertion section of various information such as reception gain adjustment that assists in the synchronization establishment, and the data portion 29 as an insertion section of data are arranged in this order.

Typically, the ADC performance that is required at the time of the synchronization establishment by various information such as the reception gain adjustment that assists in the synchronization establishment is not high compared with at the time of the synchronization establishment in the synchronization portion (#1) 27a and at the time of the demodulation in the data portion 29. Therefore, it is considered that the influence on the demodulation result in the data portion 29 is relatively low even if the ADC output becomes unstable when the bias current value is switched in the section of the synchronization portion (#2) 27b.

Thus, in the fifth embodiment, the header information and auxiliary information detecting unit 35 is provided, which detects the synchronization establishment auxiliary information (e.g., reception gain adjustment information) in the section of the synchronization portion (#2) 27b in addition to the header information (modulation scheme). The detection of the insertion position of the reception gain adjustment information in the section of the synchronization portion (#2) 27b is performed by monitoring the elapsed time from the synchronization establishment time in the synchronization portion (#1) 27a in the similar manner to the detection of the header information (modulation scheme).

When the modulation scheme is notified from the header information and auxiliary information detecting unit 35, the bias current supplying unit 18 determines the bias current value in accordance with the modulation scheme by the method explained in the second embodiment (FIG. 3); however, the bias current supplying unit 18 does not supply the bias current to the ADC main unit 17 at this time. When the detection notification of the synchronization establishment auxiliary information, in this example, the reception gain adjustment information, inserted in the section of the synchronization portion (#2) 27b is input from the header information and auxiliary information detecting unit 35, the bias current supplying unit 18 supplies the bias current determined as above to the ADC main unit 17 in the insertion section of the reception gain adjustment information. Whereby, the influence on the demodulation processing performed in the section of the data portion 29 by the demodulation unit 15 can be reduced.

In this manner, according to the fifth embodiment, in addition to the effect similar to that in the second embodiment, the effect of reducing the influence of the ADC output in the transient state immediately after switching the bias current on the demodulation performance can be obtained.

In the first embodiment also, the bias current value is switched when transmitting to the receive state, so that the output of the ADC becomes unstable and the demodulation performance is influenced in the similar manner. The content explained in the fourth and fifth embodiments can be applied to the first embodiment in the similar manner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling power consumption for a radio receiver that includes a plurality of receiving antennas that receives signals radio-transmitted from a plurality of transmitting antennas and is configured such that a plurality of analog/digital converting units, which digitalize received signals that are received from the receiving antennas and down-converted in a radio frequency unit and take the digitalized signals in a baseband unit, are capable of setting a bias current, the method comprising:

recognizing number of parallel transmission data at a same time with a same frequency that is indicated in a header portion detected from a result of demodulation of digital signals output from the analog/digital converting units, respectively; and setting increase or decrease of the bias current in accordance with the recognized number of the parallel transmission data.

2. The method of controlling power consumption according to claim 1, further comprising switching supplying of the set bias current in a guard interval section detected from a result of demodulation of the digital signal output from the analog/digital converting unit, when the communication signal has a format having the guard interval section for each data section in a data portion.

3. The method of controlling power consumption according to claim 1, further comprising switching supplying of the set bias current in a section of a predetermined auxiliary information in an auxiliary information detected from a result of demodulation of the digital signal output from the analog/digital converting unit, when the communication signal has a format in which the auxiliary information on synchronization establishment is inserted between a header portion and a subsequent data portion.

4. The method of controlling power consumption according to claim 1, wherein the setting increase or decrease of the bias current includes referring to a correspondence table in which a bias current value with which a required performance can be realized is defined for each number of the parallel transmission data.

5. A method of controlling power consumption for a radio receiver that is configured such that an analog/digital converting unit, which digitalizes a received signal down-converted in a radio frequency unit and takes the digitalized signal in a baseband unit, is capable of setting a bias current, the method comprising:

determining whether a change is a first change in which a state is changed from a receive state of a communication signal to a standby state of the communication signal or a second change in which a state is changed from the standby state to the receive state based on a digital signal output from the analog/digital converting unit; and setting the bias current to a value smaller than a value in a case of the second change when the determined change is the first change, and setting the bias current to a value larger than a value in a case of the first change when the determined change is the second change, in accordance with a result of judgment, switching supplying of the set bias current in a section of a predetermined auxiliary information in an auxiliary information detected from a result of demodulation of the digital signal output from the analog/digital converting unit, when the communication signal has a format in which the auxiliary information on synchronization establishment is inserted between a header portion and a subsequent data portion.

6. A method of controlling power consumption for a radio receiver that is configured such that an analog/digital converting unit, which digitalizes a received signal down-converted in a radio frequency unit and takes the digitalized signal in a baseband unit, is capable of setting a bias current, the method comprising:

recognizing a signal to noise ratio (SNR) required for the analog/digital converting unit with respect to a modulation scheme indicated in a header portion that is detected from a result of demodulation of a digital signal output from the analog/digital converting unit; and setting increase or decrease of the bias current in accordance with the recognized SNR required for the analog/digital converting unit, switching supplying of the set bias current in a section of a predetermined auxiliary information in an auxiliary information detected from a result of demodulation of the digital signal output from the analog/digital converting unit, when the communication signal has a format in which the auxiliary information on synchronization establishment is inserted between a header portion and a subsequent data portion.

7. A method of controlling power consumption for a radio receiver that is configured such that an analog/digital converting unit, which digitalizes a received signal down-converted in a radio frequency unit and takes the digitalized signal in a baseband unit, is capable of setting a bias current, the method comprising:

determining whether a change is a first change in which a state is changed from a receive state of a communication signal to a standby state of the communication signal or a second change in which a state is changed from the standby state to the receive state based on a digital signal output from the analog/digital converting unit; and setting the bias current to a value smaller than a value in a case of the second change when the determined change is the first change, and setting the bias current to a value larger than a value in a case of the first change when the determined change is the second change, in accordance with a result of judgment, selecting the bias current supplied in the case of the second change in accordance with a reception level from among two or more bias currents that are prepared in advance.

8. A method of controlling power consumption for a radio receiver that is configured such that an analog/digital converting unit, which digitalizes a received signal down-converted in a radio frequency unit and takes the digitalized signal in a baseband unit, is capable of setting a bias current, the method comprising:

recognizing a signal to noise ratio (SNR) required for the analog/digital converting unit with respect to a modulation scheme indicated in a header portion that is detected from a result of demodulation of a digital signal output from the analog/digital converting unit; and setting increase or decrease of the bias current in accordance with the recognized SNR required for the analog/digital converting unit, wherein the setting increase or decrease of the bias current includes referring to a correspondence table in which a bias current value with which a required performance can be realized is defined for each modulation scheme.

* * * * *